Jan. 22, 1957   N. C. FULLER   2,778,500
OIL SKIMMING DEVICE
Filed April 18, 1955   2 Sheets-Sheet 1
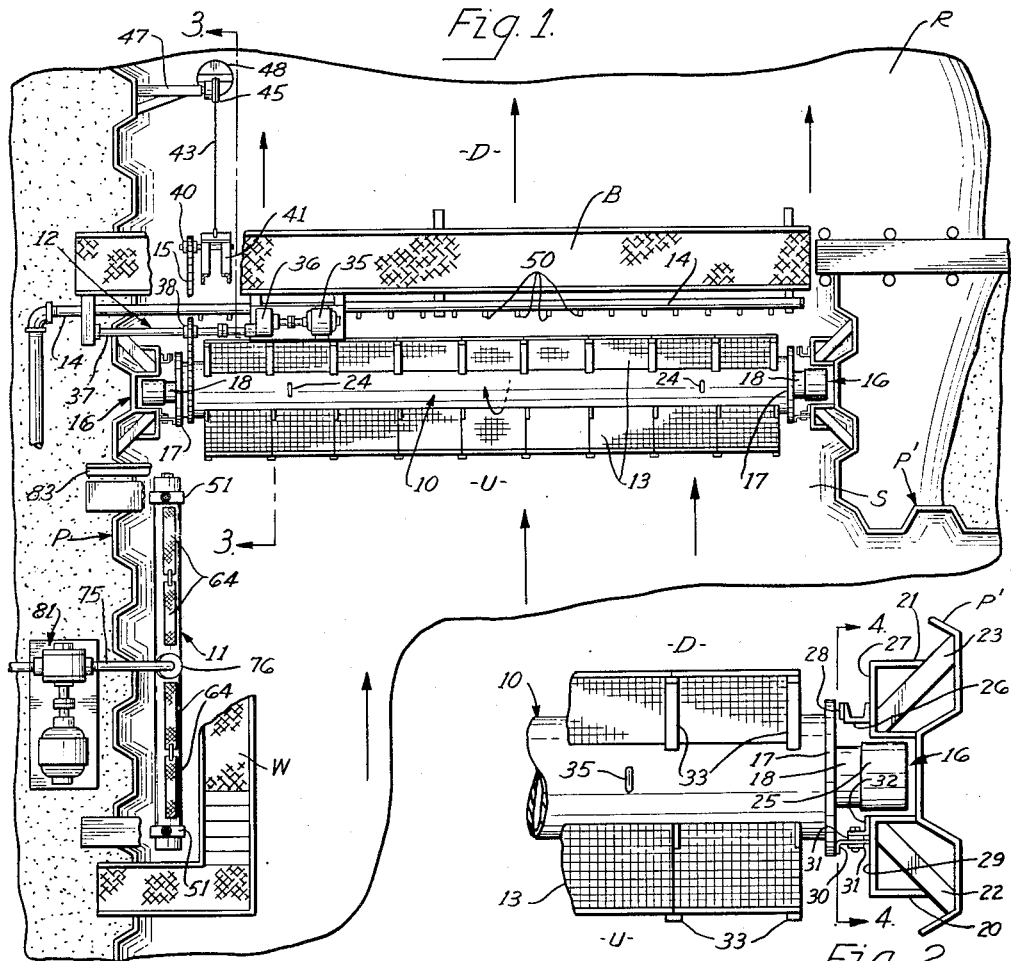
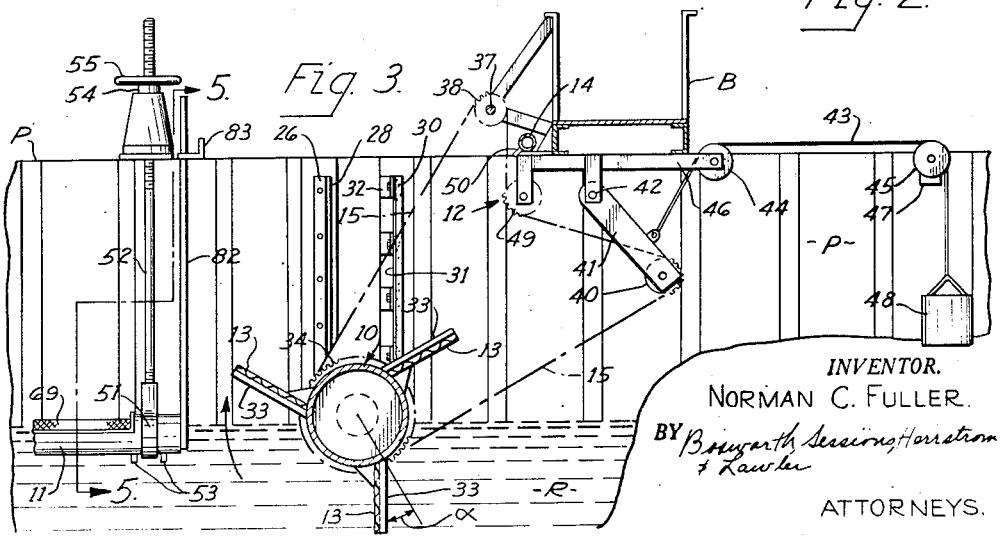
INVENTOR.
NORMAN C. FULLER.
ATTORNEYS.

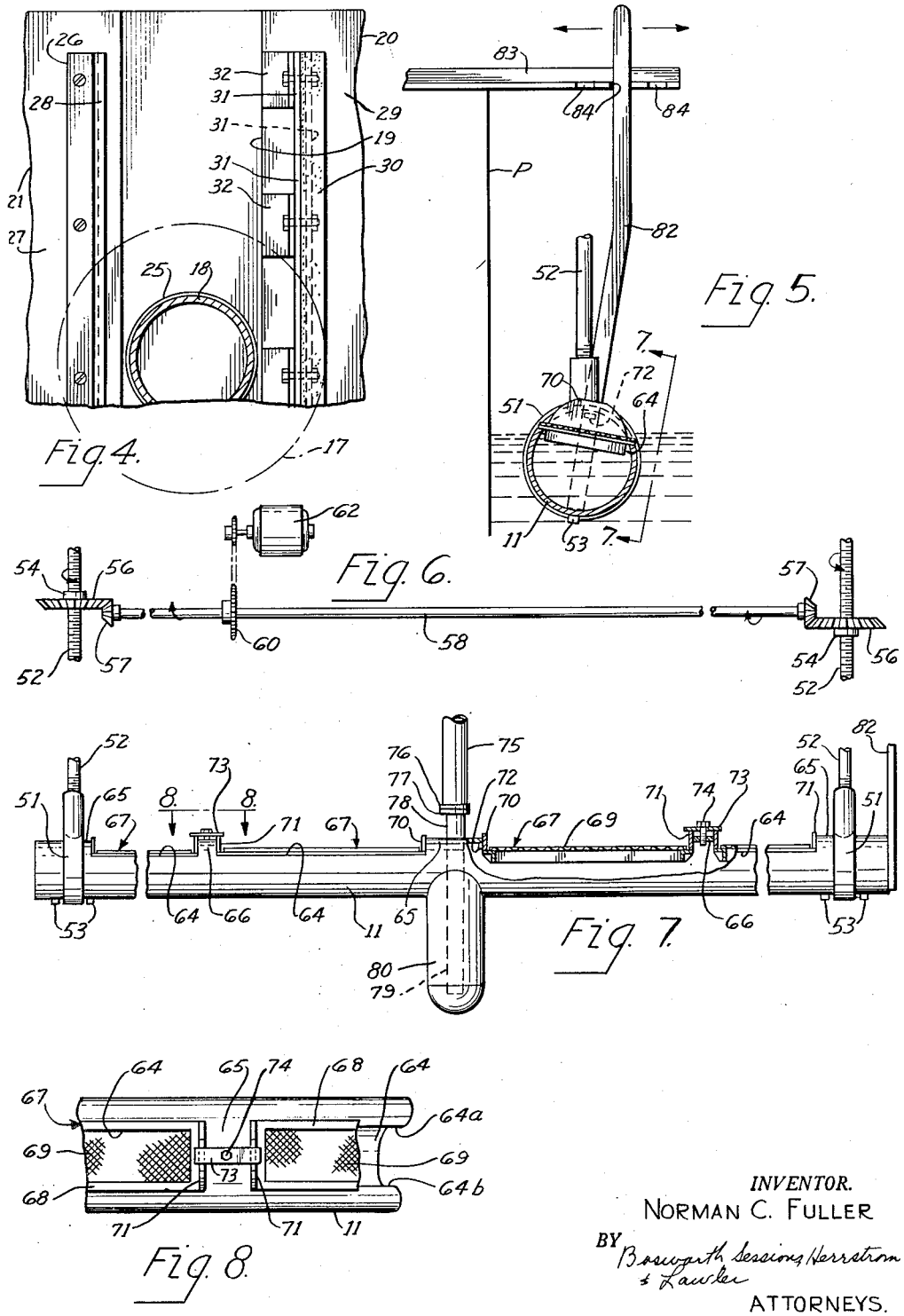

United States Patent Office 2,778,500
Patented Jan. 22, 1957

2,778,500

OIL SKIMMING DEVICE

Norman C. Fuller, Fairview Park, Ohio, assignor to The Standard Oil Company, Cleveland, Ohio, a corporation of Ohio Application April 18, 1955, Serial No. 501,781

11 Claims. (Cl. 210—51)

This invention relates to skimming apparatus and more particularly to apparatus for removing oils from the surface of a watercourse such as a river slip or a stream. The term oils as used herein is intended to include petroleum and other oils, paints, and other inflammable industrial effluents and emulsions thereof with water.

River slips and streams feeding into larger bodies of water frequently are used by industrial plants to carry away waste effluents from plant sites. Substantial quantities of inflammable wastes emptying into the main river create a fire hazard threatening serious damage to water craft on and installations along the river. A practical solution is removal of the wastes from the river slip ahead of its junction with the main river. However skimming facilities heretofore employed for this purpose have a tendency to become clogged and blocked by solid trash which floats along the slip to the skimmer installation, and accordingly constant attention of an operator is required to remove the trash in order to keep the skimmer functioning properly.

A general object of my invention is the provision of skimming apparatus which effectively removes oils from a moving stream and which does not require constant attention of an operator. Another object is the provision of skimming apparatus with novel automatic means for separating solid debris from industrial effluents in river slips and for passing the separated debris into the slip downstream from the apparatus. A more specific object is the provision of a rotatable barrier for passing over trash and debris floating on the surface of a stream or river slip and collected by the barrier. A further object is the provision of means for cleaning oils from the trash being transferred to the downstream side of the barrier. Another object is the provision of a positive seal for the ends of the barrier or boom to prevent escape of floating matter around the ends of the boom. Still another object is the provision of a reversible positive drive for rotating a floating skimmer boom, the drive being capable of adjusting automatically to accommodate changes in boom elevation due to changes in water level in the river slip.

Another object is the provision of a removable floating barrier for a watercourse in conjunction with a skimming trough located out of the path of marine traffic on the watercourse. A further object is the provision of an effective skimming trough of simplified construction and having removable filtering screens.

My invention comprehends skimming apparatus with a removable rotatable floating boom for a moving watercourse, which boom blocks passage of oils on the water surface and which, when rotated, transfers solid floating trash from the upstream side to the downstream side of the boom. The boom rotating mechanism is automatically adjustable to positively drive the boom at various elevations incident to changes in the water level. The skimming apparatus also includes an adjustable skimming trough located to one side of the watercourse and adjacent to and on the upstream side of the boom for removal of surface oils collected by the boom.

The mode of attainment of the above and other objects of my invention will become apparent from the following description of a preferred embodiment thereof, reference being had to the accompanying drawings.

Figure 1 is a plan view of a river slip skimming installation which includes a skimming trough and a floating boom embodying my invention.

Figure 2 is an enlarged plan view of one end of the boom showing details of the end seal, the thrust bearing and the boom end guides.

Figure 3 is a vertical section of the boom showing the boom drive arrangement in schematic form, the section being viewed on the line 3—3 of Figure 1.

Figure 4 is a fragmentary vertical section showing the end seal and thrust bearing, the section being viewed on the line 4—4 of Figure 2.

Figure 5 is a vertical section of the skimming trough showing the trough screens and the skimming depth adjusting lever, the section being taken on the line 5—5 of Figure 3.

Figure 6 is an elevation of a modified form of trough elevating mechanism.

Figure 7 is a modified elevation of the skimming trough viewed on the line 7—7 of Figure 5.

Figure 8 is an enlarged fragmentary plan of the skimming trough viewed on the line 8—8 of Figure 7.

The skimming apparatus embodying my invention is designed for use on a moving watercourse such as a river slip R, see Figure 1, in which a sluiceway S is formed, for example, by side piling P defining one side of the slip and an L-shaped row of piling P' projecting into the water from the opposite slip embankment. All water leaving the slip passes through the sluiceway in a direction of the arrows in Figure 1, and a floating barrier or boom 10 extends along the water surface for the full width of the sluiceway for blocking surface flow through the sluiceway. The upstream sides of the boom is designated as U and the downstream side as D in the drawing. A bridge B extending across the sluiceway provides access to both ends of the boom for maintenance purposes and additionally serves as a support for a boom washing pipe and a boom drive mechanism which are described below. This bridge may be lifted or rotated by suitable mechanism, not shown, from the position shown in Figure 3 to the side of the slip in order to permit passage of maintenance, dredging and other marine craft when the sluiceway is open.

The skimmming apparatus illustrated in the drawings as a preferred embodiment of my invention comprises the boom 10 which floats in the sluiceway S transversely of the water flow, and a skimming trough 11 located out of the line of marine traffic, that is, along one side, the left side as viewed in Figure 1, of the slip and adjacent to and on the upstream side U of the boom. All matter floating on the surface of the water in the slip is blocked at the sluiceway by the boom, and the trough skims off trapped surface oils. A reversible positive drive mechanism, indicated in general at 12, see Figures 1 and 3, rotates the boom about its longitudinal axis and solids trapped by the boom are transferred either over or under the boom to the downstream side D by means of a plurality of longitudinal rows of perforate baffles or gratings 13 secured to and projecting outwardly from the boom for a substantial portion of its length. Bridge B supports a water pipe 14 which extends the length of the boom and which has a series of jets for washing oils adhering to the boom and to the debris on the boom grating.

Boom 10 floats and thus rises and falls with changes in water level so as to be in the proper operating position at all times. The boom drive mechanism includes a motor driven endless chain 15, see Figures 1 and 3, arranged positively to drive the boom regardless of variation in boom elevation resulting from changes in the water level. The ends of the boom ride in vertical guideways 16 which are open at the top to permit removal of the entire boom from its operative position for opening the sluiceway to surface craft.

Boom 10 comprises an imperforate pipe or tube whose opposite ends are closed by plates 17. Thus the entire boom constitutes a float which rides partially submerged in the sluiceway with its longitudinal axis slightly above water level. Stub axles 18, see Figures 1, 2 and 4, project from opposite end of the boom, axially from end plates 17, and are journalled adjacent the piling P and P′ in the vertically extending oppositely disposed guideways 16 defined by opposed pairs of channel guide members 20, 21, these members being welded to the piling members P, P′, and reinforced by braces 22, 23. The width of each guideway 16 is slightly greater than the diameter of the stub axles 18 so that the boom can move vertically and can rotate with substantial freedom and yet without excessive diametric play between the guide members 20, 21. Eyebolts 24 secured to the boom along its periphery permit a crane readily to engage and lift the boom along guideways 16 and out of the sluiceway when desired. Bearing collars 25 are pressed on axles 18 and reduce wear of the engaging parts.

The guideway and boom assemblies at opposite sides of the sluiceway are identical and accordingly the following description will be limited to the assembly at one side of the sluiceway, the right side as viewed in the drawings. In order to limit endwise movement of the floating boom within the sluiceway, a thrust bearing 26, see Figures 2 and 4, is provided at each end of the boom between the face 27 of the downstream guide member 21 and adjacent end plate 17 of the boom. Bearing 26 is secured to guide member 21 and comprises an elongated channel which extends vertically an equal distance above and below the mean slip water level, and which is lined with a strip 28 of brass or similar bearing metal on the side of the channel facing the boom end plate. Thrust bearing 26 also sufficiently spaces boom end plate 17 from face 29 of the upstream guide member 20 to permit mounting of a boom end seal 30 on the upstream side of the boom axis. Seal 30 preferably comprises an elongated strip of oil resistant rubber which makes sealing engagement with end plate 17 and with the face 29 of guide member 20 for a distance corresponding to the normal range of change of slip water level. To support strip seal 30, retainer strips 31 fastened on opposite sides of the seal are secured to a plurality of vertically spaced angle members 32 which are welded to guide member 20. Retainers 31 are spaced from guide member face 29 and from end plate 17, and seal strip 30 extends laterally from opposite retainer edges to resiliently engage and seal against the face of the guide member and against the boom end plate 17. The boom ends thus are sealed throughout the range of changes in height of water level and escape of surface oils to the downstream side is prevented.

The longitudinal rows of boom gratings 13 preferably are equally spaced around the boom periphery, see Figure 3, and each row projects outwardly at an angle α to the boom radius passing through the base of the row, the angle being measured from the radius to the plane of the grating in a clockwise direction as viewed in Figure 3. When the boom is rotated in one direction, clockwise as viewed in Figure 3, the rows of gratings successively pass up through the water surface on the upstream side, each row being approximately parallel to the water surface at the moment the gratings emerge from the water. The angle α of the grating is selected so that during rotation of the boom the outer and inner ends of each row of gratings emerge from the slip surface at substantially the same time, and the angle selected is related therefore to the height of the boom axis above the water surface. When the boom is rotated in the opposite direction, counterclockwise as viewed in Figure 3, the gratings pass downwardly through the slip surface on the upstream side in substantially the same manner. The gratings filter the accumulated matter and transfer the solid debris either over or under the boom, depending on the direction of rotation, to the downstream side of the boom. The gratings in each row are secured to support struts 33 spaced longitudinally along the boom and preferably take the form of a series of individual grate panels, each panel being secured at opposite ends on adjacent struts 33.

A sprocket 34 mounted concentrically on the boom periphery at the left end of the boom, as viewed in the drawings, is engaged by chain 15 for rotating the boom. The mechanism for driving chain 15 preferably is mounted on the bridge B and comprises a reversible, preferably explosion-proof, motor 35 and a reducer 36, the output shaft 37 of which mounts drive sprocket 38 in alignment with boom sprocket 34. In order to maintain tension in chain 15 for proper engagement with boom sprocket 34 throughout the range of elevations of the boom corresponding to variations in height of slip water level, a tensioning sprocket 40 is mounted for rotation on the lower end of a vertically swingable frame 41 pivoted at 42 to the under side of the bridge. Frame 41 is urged upwardly by a counterweight arrangement consisting of a cable 43 fastened to and extending up from the frame, over a pair of sheaves 44, 45 which are supported on brackets 46, 47, respectively, and down to a counterweight 48 which hangs freely at the end of the cable. Drive chain 15 passes from the top of boom sprocket 34, over drive sprocket 38, around an idler sprocket 49, over the top of tensioning sprocket 40 and back to the under side of the boom sprocket 34. As the boom moves up and down with changes in the height of slip water level, counterweight 48, acting on the chain through frame 41 and sprocket 40, takes up slack in the chain and keeps it tight at all times.

Water pipe 14 supported on the side of bridge B facing the boom 10, carries water to a row of longitudinally spaced jets 50 for washing the boom and debris being passed over by the boom. The row of jets 50 is coextensive with the boom grating 13, each jet being oriented to direct a spray of water across the top of the boom against the gratings on the upstream side of the boom, see Figure 3, to wash accumulated oil from the boom proper, from the gratings and from the debris on the gratings. Alternatively, large or bulky pieces of debris may be "rinsed" by passing the debris under the boom from the upstream to the downstream sides by rotation of the boom in a counterclockwise direction as viewed in Figure 3.

The boom 11, riding on the surface of the water, blocks all floating matter carried by the slip current so that oil slicks remain on the upstream side of the boom where they are removed by the action of the skimming trough 11. Trough 11 comprises an elongated preferably cylindrical pipe or tube and is supported at opposite ends in sling bands 51 carried at the lower end of elevator screws 52 by means of which the entire trough is raised and lowered. Sling bands 51 permit limited rotation of the trough about its own axis, lugs 53 on the lower portion of opposite ends of the trough preventing relative longitudinal movement between the bands 51 and the trough. Screws 52 extend upwardly to the top of the side piling and respectively engage vertically fixed nuts 54, see Figures 3 and 6. Screws 52 and hence the trough are moved vertically through rotation of the nuts 54 either separately by means such as handwheels, one of which is shown at 55 in Figure 3, or simultaneously by means comprising bevel gears 56, 57, see Figure 6, and power shaft 58 which rotate each nut 54 simultaneously. Shaft 58 may be rotated by sprocket 60 driven manually or by a reversible motor 62. If fully automatic operation of the trough raising and lowering mechanism is desired, motor 62 may be operated by a float control, not shown, which is responsive to the height of water level in the slip to raise and lower the trough and thereby to maintain the trough intake openings at slip water level.

Trough 11 has a plurality of longitudinally aligned intake openings 64, see Figures 1, 5 and 8, into which scum on the surface of the slip passes into the trough during the skimming operation. The openings 64 preferably are rectangular, are formed in the upper portion of the trough, as shown in the drawings, and each is defined on two sides by the axially extending laterally spaced edges 64a, 64b, see Figure 8, of the trough wall and at the ends by circumferentially continuous upper trough wall sections 65, 66. Each intake opening has a removable screen unit 67 which seats tightly over the entire trough opening and filters solid objects from the matter passing into the trough. Each screen unit comprises a rectangular frame 68 on which suitable screen material 69 is mounted and which has upright locking flanges 70, 71 at opposite ends. Flange 70 has an external lug 72 adapted to extend under the adjacent trough top section 65 to lock that end of the screen in place, the opposite screen end being releasably secured by a lock bar 73 which is pivoted to trough top section 66 and which, in locked position, overlies and tightly presses against screen flange 71. The screen units are removed, when desired, by loosening bolt 74 on the lock bar, swinging the latter transversely of the trough, and lifting the screen unit out of the trough opening.

Trough discharge line 75 carries oil from the trough to separators, not shown, and preferably is a flexible hose connected by flange 76 to flange 77 of a rigid pipe 78 secured to and extending inwardly from the central upper trough section 65. The opposite end 79 of pipe 78 extends into a sump 80 which depends from and opens into the lower part of the trough. Oil passing into the trough through the intake openings fills sump 80 and seals the lower end 79 of the pipe 78. When discharge pump 81 in line 75 operates to withdraw oil from the trough, oil in sump 80 maintains a liquid seal at the line intake end 79 at all times and thus insures efficient operation of the pump.

In order to vary the skimming depth of the trough, that is, to vary the depth of the side edges of the trough openings 64 below the slip surface, an adjusting bar 82, see Figures 3 and 5, is secured to one end of the trough and extends up to engagement with a notched member 83 projecting outwardly from the top of the piling. The bar 82 is engageable in any of the notches 84 of member 83 for locking the trough against rotary movement and is movable by the operator toward and away from the piling for rotating the trough in sling bands 51 to selectively adjust the angular position of the trough. By rocking the trough about its axis, the depth of skimming or "shave" angle is controlled, the trough intake openings 64 normally inclining toward the middle of the slip, as shown in Figure 5. Preferably, the trough "shave" angle is adjusted to permit collection only of oil from the slip surface, albeit some water occasionally may be collected with the oil as a result of swells on the slip surface caused by wind or other adverse conditions. In order to permit access to the trough for inspection, cleaning and maintenance purposes, a scaffold or walkway W, see Figure 1, is adjustably supported from the top of the side piling P and extends along the intake side of the trough.

Trough discharge pump 81 operates more or less continuously so that skimming preferably is continuous. The elevation of the trough relative to the height of water in the slip is checked periodically if automatic control is not employed, and rough adjustment of the trough height is made, if necessary, by the lift screws 52 and nuts 54 so that the trough intake openings 64 are approximately at water level. Fine adjustment of the trough position is afforded by the skimming depth adjusting bar 82 with which the entire trough 11 is rocked about its axis. Pump 81 in discharge line 75 withdraws oil from the trough, thus lowering the oil level in the trough below the slip surface and permitting oil on the slip surface to flow into the trough.

The operation of the boom 10 may be intermittent, the frequency of operating periods being dependent upon the quantity of trash and debris in the slip and the rate of slip flow which in turn determine the rate of accumulation of the trash ahead of the boom. When a sufficient quantity of trash and debris has been collected by the boom, the boom drive motor 35 is turned on, causing the boom to rotate and causing the gratings 13 to sweep through upstream accumulations and to separate the solids from the liquid wastes. If the boom is rotated to pass the separated solids over the boom, water under pressure is admitted to pipe 14, jets 50 spraying the boom and trash being passed over and removing adhering oils therefrom before the trash is dumped into the slip on the downstream side of the boom. If the boom is rotated in a reverse direction to pass the trash under the boom, washing pipe 14 is not used. After the boom has made a number of revolutions sufficient to remove debris and trash from the upstream accumulation, motor 35 is turned off. Any small pieces of trash that are not picked up by the boom gratings 13 collect on the finer trough screens 69 which may be cleaned periodically by the operator. If conditions require, the boom may be operated for longer periods or even continuously.

Changes in and modifications to the above described embodiment of my invention may be made by those skilled in the art without departing from the precepts and scope of the invention as defined in the appended claims.

I claim:

1. In skimming apparatus for a watercourse, an imperforate member traversing the watercourse and extending slightly above and below the water level, means for restraining the member from moving with current in the watercourse whereby the member blocks matter floating on the water, a baffle on said member, and means for rotating said member about an axis transverse to the current whereby said baffle sweeps vertically through the accumulations on the upstream side of the member and carries the solids to the downstream side of the member.

2. In skimming apparatus for a watercourse, a floating member traversing the watercourse, means for restraining movement of the member parallel to the surface of the water whereby the member blocks matter floating on the water, a perforate baffle on said member, and means for rotating said member about an axis transverse to the flow of water whereby said baffle sweeps vertically through the accumulations on the upstream side of the member, separates solids from the liquids and carries the solids to the downstream side of the member.

3. The combination of claim 2 including means for directing a washing stream toward the upstream side of the member and against said baffle and the solids carried thereby.

4. In skimming apparatus for a river slip or the like, a floating member traversing the slip, means for restraining movement of the member parallel to the slip surface whereby the member blocks matter floating on the slip, a perforate baffle on said member, an endless drive chain engageable with said member for rotating said member about an axis extending transversely of the flow of water in the slip whereby said baffle sweeps through and filters surface accumulations adjacent the upstream side of the member and transfers separated solids to the downstream side, means to drive said chain, and means for maintaining uniform tension in said chain for various elevations of said floating member.

5. In skimming apparatus for a stream, a floating boom traversing the stream, laterally aligned guides at opposite ends of the boom, stub axles on the boom ends journalled in said guides and restraining movement of the boom parallel to the surface of the stream, at least one perforate baffle projecting outwardly from said boom and extending longitudinally of the boom for a substantial portion of the boom length, a sprocket on said boom, a drive chain engaging said sprocket, means for driving said chain to rotate said boom about its longitudinal axis, a tensioning sprocket engageable with said chain, and means for urging said tensioning sprocket against said chain to maintain substantially uniform tension in the chain for normal variations in boom elevation incident to changes in stream surface elevation, said baffle during rotation of the boom sweeping transversely through surface accumulations on the upstream side of the boom and transferring solids to the downstream side of the boom.

6. In skimming apparatus for a stream having a sluiceway, a floating rotatable boom traversing the sluiceway, said boom having a plate at each end and a stub axle projecting from each plate, vertically extending horizontally spaced members at each side of the sluiceway defining an inwardly opening vertically elongated guideway having a width greater than the diameter of either of said axles, a thrust bearing supported on one of said guide members at each side of the sluiceway and engageable with the proximate end plate of the boom for limiting endwise movement of the boom in the sluiceway, an elongated vertically extending seal traversing the surface of the stream and supported between the other of said guide members and the proximate boom end plate at each side of the sluiceway and sealing the space between the end plate and the guide member, a perforate baffle extending along the periphery of said boom for substantially the length of the boom and projecting outwardly therefrom, means to rotate said boom about its longitudinal axis whereby said baffle sweeps vertically through the surface of the stream and passes solid floating objects from the upstream side to the downstream side of the boom.

7. In skimming apparatus for a stream having a sluiceway through which the stream flows, an elongated imperforate rotatable boom floatable on said stream and disposed with its longitudinal axis extending transversely of the sluiceway, vertically extending guideways at opposite sides of the sluiceway, the ends of said boom being journalled in said guideways whereby said boom can move vertically freely with changes in height of the stream surface and can rotate freely about its longitudinal axis, means for sealing the ends of said boom throughout the range of vertical movement of the boom, means for rotating said boom, and means rotatable with and projecting outwardly from the periphery of said boom for passing solid floating objects from the upstream to the downstream sides of the boom.

8. Apparatus for skimming a river slip or the like comprising a sluiceway through which water in the slip passes, a floating member traversing the sluiceway, means for restraining movement of the member parallel to the slip water surface whereby the member blocks matter floating on the slip, a perforate baffle on said member, means for rotating said member about an axis extending transversely of the direction of slip flow through the sluiceway whereby said baffle sweeps vertically through the accumulations on the upstream side of the member and carries the solids to the downstream side of the member, and a skimming trough disposed at the water surface along one side of the sluiceway adjacent to and on the upstream side of said member for removing non-solid floating accumulations blocked by said member.

9. Apparatus according to claim 8 in which said trough comprises a pipe having at least one intake opening formed in a portion of the wall of the pipe, said pipe being supported for limited rotation about the longitudinal axis of the pipe for adjusting the depth of submersion of said opening and thereby the depth of skimming by said trough.

10. Apparatus for skimming a stream or the like comprising a partially submerged barrier traversing the full width of the stream, vertically open guideways engaging opposite ends of barrier and guiding movement of said barrier substantially in a vertical plane, and a skimming trough disposed at water level along one side of the stream and adjacent the upstream side of said barrier.

11. Skimming apparatus for a watercourse comprising a boom traversing the watercourse and riding on the surface of the water for blocking matter floating on the watercourse, and a skimming trough located to one side of the watercourse adjacent to and on the upstream side of said boom, said trough being supported at water level and having an intake opening, an edge of said opening being located below water level at skimming depth, a discharge line connected to said trough, and means for pumping water from said trough through said discharge line for lowering the level of water in the trough below the level of water in the watercourse.

References Cited in the file of this patent

UNITED STATES PATENTS

| | | |
|---|---|---|
| 95,089 | Cowley | Sept. 21, 1869 |
| 1,012,500 | Aitken | Dec. 19, 1911 |
| 1,150,348 | Dreher | Aug. 17, 1915 |
| 1,860,819 | Schamberger | May 31, 1932 |
| 1,922,442 | Knight | Aug. 15, 1933 |
| 1,981,310 | Currie | Nov. 20, 1934 |
| 2,470,418 | Verner | May 17, 1949 |